(12) United States Patent
Kuan et al.

(10) Patent No.: US 7,385,948 B2
(45) Date of Patent: Jun. 10, 2008

(54) DETERMINING THE STATE OF A STATION IN A LOCAL AREA NETWORK

(75) Inventors: Chia-Chee Kuan, Los Altos, CA (US); Miles Wu, Fremont, CA (US); Dean Au, Sunnyvale, CA (US)

(73) Assignee: Airmagnet, Inc., Sunnyvale, CA (US)

( * ) Notice: Subject to any disclaimer, the term of this patent is extended or adjusted under 35 U.S.C. 154(b) by 0 days.

(21) Appl. No.: 11/804,493

(22) Filed: May 17, 2007

(65) Prior Publication Data

US 2007/0223418 A1  Sep. 27, 2007

Related U.S. Application Data

(63) Continuation of application No. 10/408,013, filed on Apr. 3, 2003.

(51) Int. Cl.
 *H04Q 7/00* (2006.01)
(52) U.S. Cl. .................. 370/328; 370/338; 370/312; 370/352; 370/252; 370/242; 455/41.2; 455/411; 455/426.2; 455/461; 455/414.1
(58) Field of Classification Search ............... 370/328, 370/338, 312, 352; 455/426.2, 411, 518
See application file for complete search history.

(56) References Cited

U.S. PATENT DOCUMENTS

| | | | | |
|---|---|---|---|---|
| 5,844,900 A | * | 12/1998 | Hong et al. ................ 370/342 |
| 5,999,525 A | * | 12/1999 | Krishnaswamy et al. ... 370/352 |
| 6,058,106 A | * | 5/2000 | Cudak et al. ............... 370/313 |
| 6,088,591 A | * | 7/2000 | Trompower et al. ........ 455/438 |
| 6,259,898 B1 | * | 7/2001 | Lewis ....................... 455/103 |
| 6,345,043 B1 | | 2/2002 | Hsu |
| 6,556,827 B1 | * | 4/2003 | Oh .......................... 455/426.2 |
| 6,577,609 B2 | * | 6/2003 | Sharony .................... 370/312 |
| 6,675,012 B2 | * | 1/2004 | Gray ......................... 455/423 |
| 6,732,163 B1 | * | 5/2004 | Halasz ...................... 709/220 |
| 6,771,962 B2 | * | 8/2004 | Saifullah et al. ........... 455/436 |
| 6,839,331 B2 | * | 1/2005 | Rudnick .................... 370/312 |
| 6,895,255 B1 | * | 5/2005 | Bridgelall ................ 455/552.1 |
| 6,947,761 B2 | * | 9/2005 | Hutcheson et al. ........ 455/518 |
| 7,039,021 B1 | * | 5/2006 | Kokudo ..................... 370/310 |
| 7,039,027 B2 | * | 5/2006 | Bridgelall .................. 370/329 |
| 7,050,452 B2 | * | 5/2006 | Sugar et al. ............... 370/465 |
| 7,054,296 B1 | * | 5/2006 | Sorrells et al. ............ 370/338 |
| 7,167,484 B2 | * | 1/2007 | Liang et al. ............... 370/445 |

(Continued)

OTHER PUBLICATIONS

Supplementary European Search Report mailed Jun. 13, 2006, for European application No. 03719629, filed Apr. 3, 2003, 2 pages.
Graham, Robert (Apr. 15, 2000) "Sniffing (network wiretap, sniffer) FAQ," downloaded from www.robertgraham.com/pubs/sniffing-faq.html, 46 pages.

(Continued)

*Primary Examiner*—Marceau Milord
(74) *Attorney, Agent, or Firm*—Blakley, Sokoloff, Taylor & Zafman LLP

(57) ABSTRACT

In a wireless local area network, transmissions exchanged between a station and an access point is received using a detector located adjacent to the station. The received transmissions are analyzed to determine the state of the station, where the state of the station indicates whether the station has authenticated and/or associated with the access point in the wireless local area network.

12 Claims, 4 Drawing Sheets

U.S. PATENT DOCUMENTS

| | | | |
|---|---|---|---|
| 7,236,460 B2 * | 6/2007 | Wu et al. | 370/241 |
| 7,295,556 B2 * | 11/2007 | Roese et al. | 370/395.3 |
| 2002/0049567 A1 | 4/2002 | Vataja | |
| 2002/0136184 A1 | 9/2002 | Liang et al. | |
| 2003/0050068 A1 | 3/2003 | Woxberg et al. | |
| 2003/0059039 A1 | 3/2003 | Meyerson et al. | |

OTHER PUBLICATIONS

International Preliminary Examination Report mailed on Dec. 16, 2003, for PCT patent application No. PCT/US03/10626 filed Apr. 3, 2003, 4 pages.

Shiann-Tsong Sheu et al., "Dynamic Access Point Approach (DAPA) for IEEE 802.11 Wireless LANs", IEEE 1999, vol. 5, pp. 2646-2650.

* cited by examiner

DETERMINING THE STATE OF A STATION IN A LOCAL AREA NETWORK

PRIORITY

This is a continuation of application Ser. No. 10/408,013, filed on Apr. 3, 2003, entitled "Determining the State of a Station in a Local Area Network," assigned to the corporate assignee of the present invention and incorporated herein by reference.

CROSS REFERENCE TO RELATED APPLICATION

This application claims the benefit of an earlier filed provisional application U.S. Provisional Application Ser. No. 60/370,996, entitled DETERMINING THE STATE OF A STATION IN A LOCAL AREA NETWORK, filed on Apr. 8, 2002, the entire content of which is incorporated herein by reference.

BACKGROUND OF THE INVENTION

1. Field of the Invention

The present invention generally relates to wireless local area networks. More particularly, the present invention relates to determining the state of a station in a wireless local area network.

2. Description of the Related Art

Computers have traditionally communicated with each other through wired local area networks ("LANs"). However, with the increased demand for mobile computers such as laptops, personal digital assistants, and the like, wireless local area networks ("WLANs") have developed as a way for computers to communicate with each other through transmissions over a wireless medium using radio signals, infrared signals, and the like.

In order to promote interoperability of WLANs with each other and with wired LANs, the IEEE 802.11 standard was developed as an international standard for WLANs. Generally, the IEEE 802.11 standard was designed to present users with the same interface as an IEEE 802 wired LAN, while allowing data to be transported over a wireless medium.

In accordance with the IEEE 802.11 standard, a station is authenticated and associated with an access point in the WLAN before obtaining service from the access point. During this authentication and association process, the station proceeds through 3 stages or states (i.e., State 1, State 2, and State 3 ). In State 1, the station is unauthenticated and unassociated. In state 2, the station is authenticated but unassociated. In State 3, the station is authenticated and associated. If a station is having difficulty obtaining service from an access point, determining the state of the station can assist in trouble shooting the problem.

SUMMARY OF THE INVENTION

In one embodiment of the present invention, in a wireless local area network, transmissions exchanged between a station and an access point is received using a detector located adjacent to the station. The received transmissions are analyzed to determine the state of the station, where the state of the station indicates whether the station has authenticated and/or associated with the access point in the wireless local area network.

BRIEF DESCRIPTION OF THE DRAWINGS

The present invention can be best understood by reference to the following detailed description taken in conjunction with the accompanying drawing figures, in which like parts may be referred to by like numerals.

DETAILED DESCRIPTION OF THE PRESENT INVENTION

In order to provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

Figure 1:
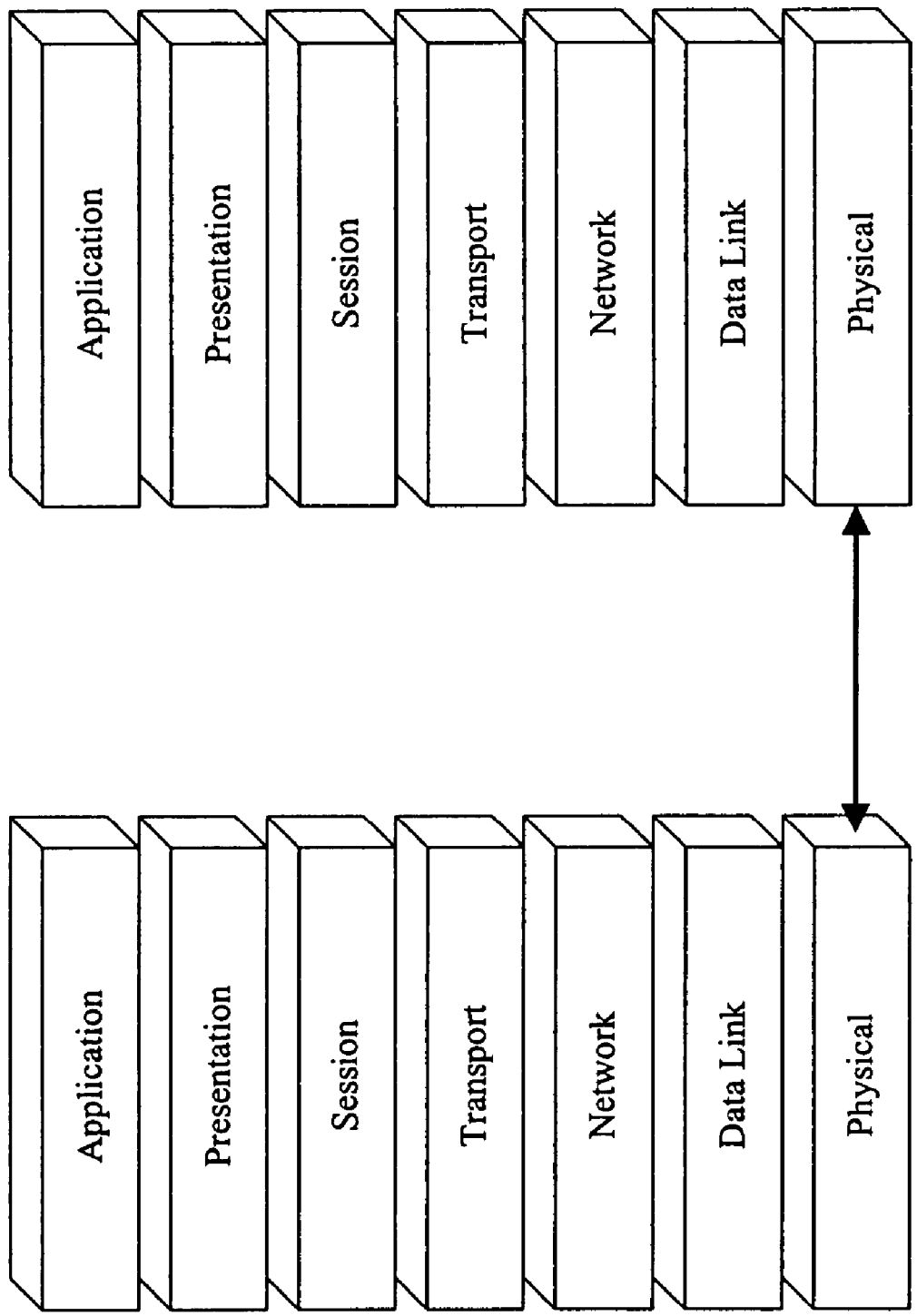
FIG. 1 shows an exemplary Open Systems Interconnection (OSI) seven layer model.

With reference to FIG. 1, an exemplary Open Systems Interconnection (OSI) seven layer model is shown, which represents an abstract model of a networking system divided into layers according to their respective functionalities. In particular, the seven layers include a physical layer corresponding to layer 1, a data link layer corresponding to layer 2, a network layer corresponding to layer 3, a transport layer corresponding to layer 4, a session layer corresponding to layer 5, a presentation layer corresponding to layer 6, and an application layer corresponding to layer 7. Each layer in the OSI model only interacts directly with the layer immediately above or below it.

As depicted in FIG. 1, different computers can communicate directly with each other only at the physical layer. However, different computers can effectively communicate at the same layer using common protocols. For example, one computer can communicate with another computer at the application layer by propagating a frame from the application layer through each layer below it until the frame reaches the physical layer. The frame can then be transmitted to the physical layer of another computer and propagated through each layer above the physical layer until the frame reaches the application layer of that computer.

The IEEE 802.11 standard for wireless local area networks ("WLANs") operates at the data link layer, which corresponds to layer 2 of the OSI seven layer model, as described above. Because IEEE 802.11 operates at layer 2 of the OSI seven layer model, layers 3 and above can operate according to the same protocols used with IEEE 802 wired LANs. Furthermore, layers 3 and above can be unaware of the network actually transporting data at layers 2 and below. Accordingly, layers 3 and above can operate identically in the IEEE 802 wired LAN and the IEEE 802.11 WLAN. Furthermore, users can be presented with the same interface, regardless of whether a wired LAN or WLAN is used.

Figure 2:
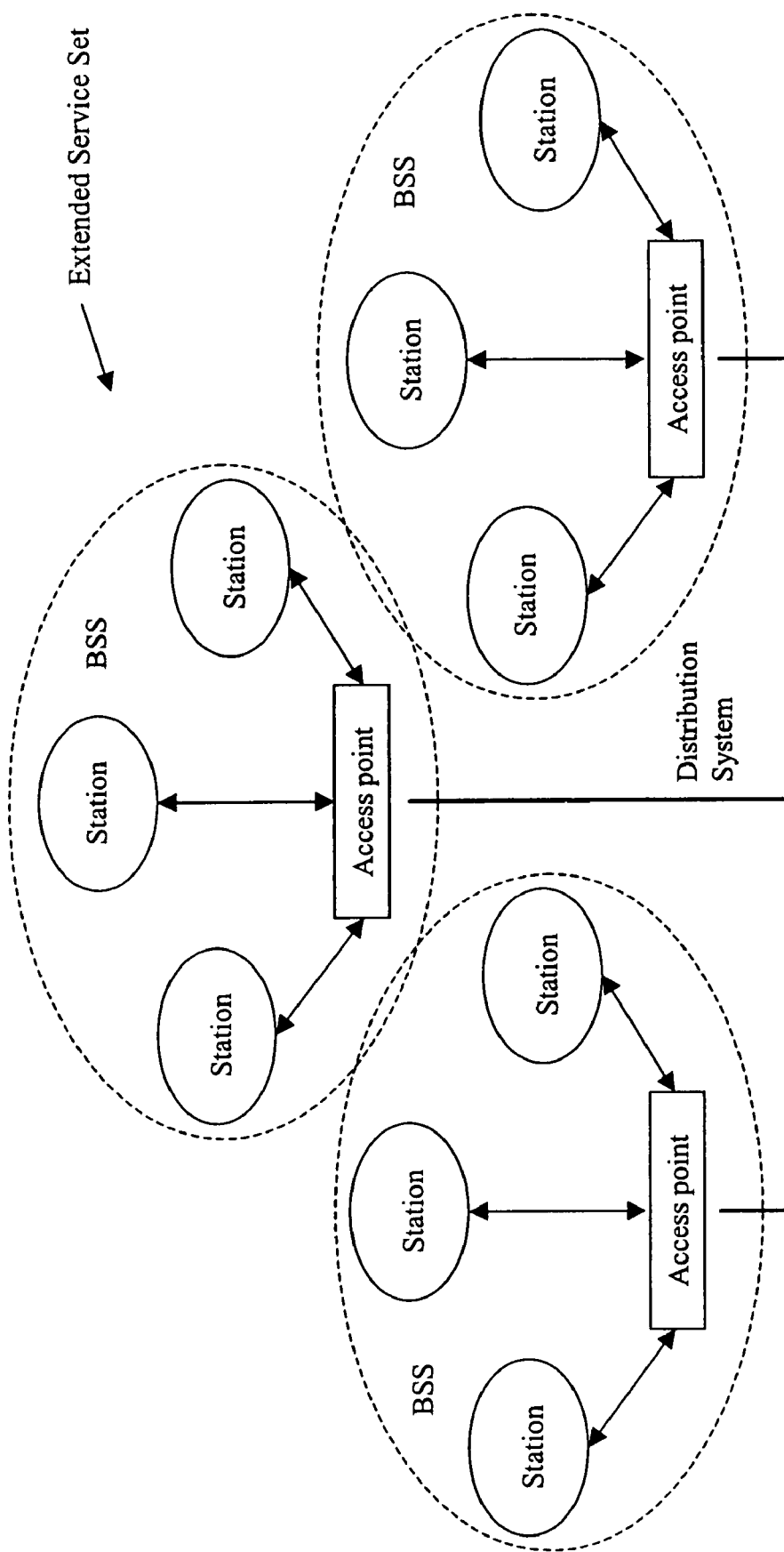
FIG. 2 shows an exemplary extended service set in a wireless local area network ("WLAN")

With reference to FIG. 2, an example of an extended service set, which forms a WLAN according to the IEEE 802.11 standard, is depicted having three basic service sets ("BSS"). Each BSS can include an access point ("AP") and one or more stations. A station is a component that can be used to connect to the WLAN, which can be mobile, portable, stationary, and the like, and can be referred to as the network adapter or network interface card. For instance, a station can be a laptop computer, a personal digital assistant, and the like. In addition, a station can support station services such as authentication, deauthentication, privacy, delivery of data, and the like.

Each station can communicate directly with an AP through an air link, such as by sending a radio or infrared signal between WLAN transmitters and receivers. Each AP can support station services, as described above, and can additionally support distribution services, such as association, disassociation, distribution, integration, and the like. Accordingly, an AP can communicate with one or more stations within its BSS, and with other APs through a medium, typically called a distribution system, which forms the backbone of the WLAN. This distribution system can include both wireless and wired connections.

Figure 3:
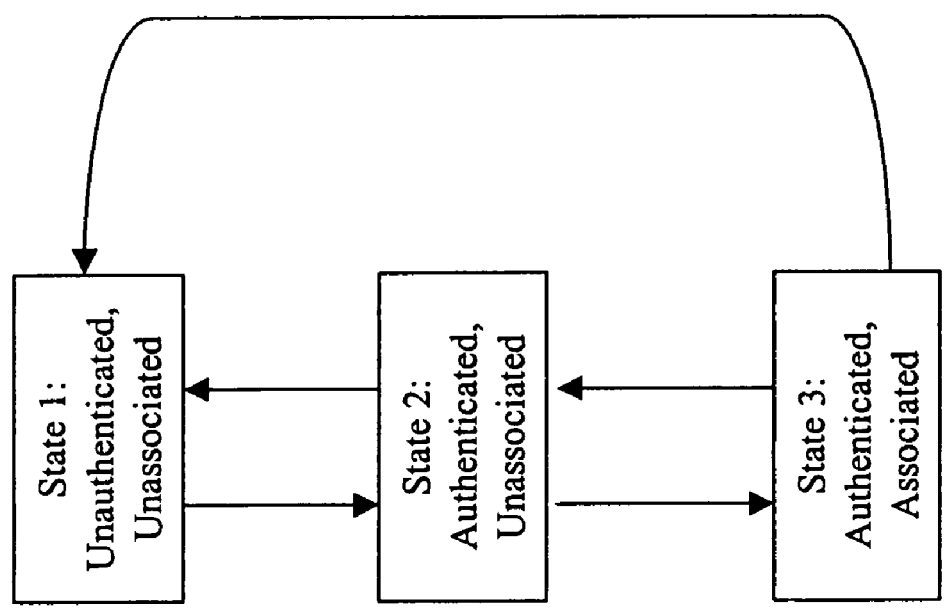
FIG. 3 is an exemplary flow diagram illustrating various states of stations in a WLAN.

With reference to FIGS. 2 and 3, under the current IEEE 802.11 standard, each station must be authenticated to and associated with an AP in order to become a part of a BSS and receive service from an AP. Accordingly, with reference to FIG. 3, a station begins in State 1, where the station is unauthenticated to and unassociated with an AP. In State 1, the station can only use a limited number of frame types, such as frame types that can allow the station to locate and authenticate to an AP, and the like.

If a station successfully authenticates to an AP, then the station can be elevated to State 2, where the station is authenticated to and unassociated with the AP. In State 2, the station can use a limited number of frame types, such as frame types that can allow the station to associate with an AP, and the like.

If a station then successfully associates or reassociates with an AP, then the station can be elevated to State 3, where the station is authenticated to and associated with the AP. In State 3, the station can use any frame types to communicate with the AP and other stations in the WLAN. If the station receives a disassociation notification, then the station can be transitioned to State 2. Furthermore, if the station then receives a deauthentication notification, then the station can be transitioned to State 1. Under the IEEE 802.11 standard, a station can be authenticated to different APs simultaneously, but can only be associated with one AP at any time.

With reference again to FIG. 2, once a station is authenticated to and associated with an AP, the station can communicate with another station in the WLAN. In particular, a station can send a message having a source address, a basic service set identification address ("BSSID"), and a destination address, to its associated AP. The AP can then distribute the message to the station specified as the destination address in the message. This destination address can specify a station in the same BSS, or in another BSS that is linked to the AP through the distribution system.

Although FIG. 2 depicts an extended service set having three BSSs, each of which include three stations, an extended service set can include any number of BSSs, which can include any number of stations.

As described above, according to the current IEEE 802.11 standard, a station is authenticated and associated with an AP to become a part of a BSS and thus obtain service. As also described above, the steps in the authentication and association process is categorized into 3 states (i.e., State 1, State 2, and State 3). Determining the state of a station can be desirable, particularly in analyzing problems that the station may be experiencing in obtaining service.

Figure 4:
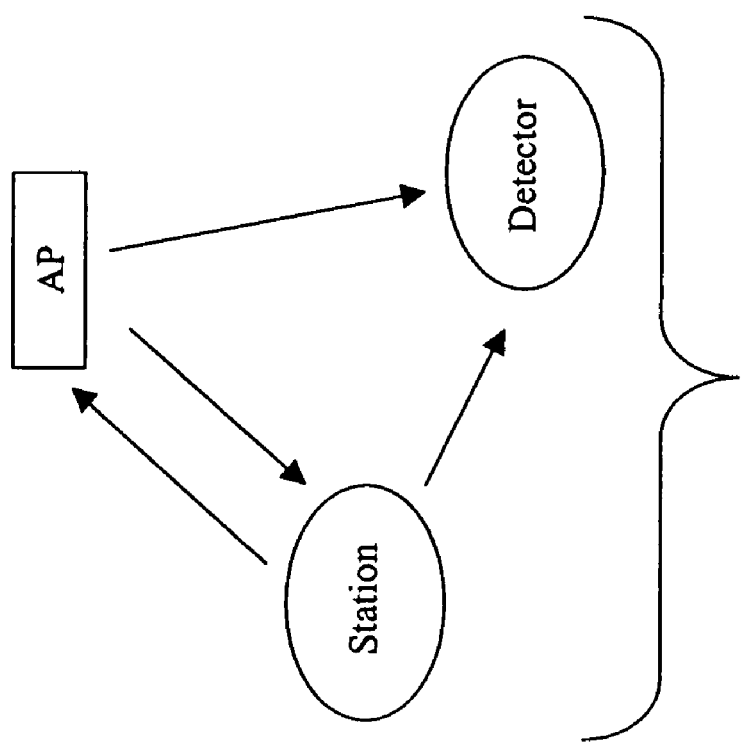
FIG. 4 shows an exemplary embodiment of an access point and a station exchanging transmissions.

For example, with reference to FIG. 4, assume that a station is having difficulty in obtaining service from an AP. Determining if the station is able to reach State 1, State 2, or State 3 can assist in trouble shooting the problem.

Thus, a detector can be located in the WLAN such that the detector can receive transmissions sent from and received by the station. Note that the detector need not necessarily be physically adjacent the station. Instead, the detector can be sufficiently near or adjacent the station such that the reception range of the detector covers the station.

By examining the transmissions sent from and received by the station, the detector can determine the state of the station. More particularly, different types of transmissions can be identified as being indicative of different states. For example, in the following table are different types of transmissions and the state that they indicate:

TABLE 1

| Type of Transmission | State |
| --- | --- |
| Probe Request Transmitted by Station | 1 |
| Probe Response Transmitted by AP | 1 |
| Authentication Request Transmitted by Station | 1 |
| Authentication Response w/ Challenge Text Transmitted by AP | 1 |
| Authentication Challenge Response Transmitted by Station | 1 |
| Authentication Final Response Transmitted by AP | 1 - on negative response<br>2 - on positive response |
| Deauthentication Transmitted by AP | 1 |
| Disassociation Transmitted by AP | 1 |
| Association Request Transmitted by Station | 2 |
| Association Response Transmitted by Station | 2 - on negative response<br>3 - on positive response |
| Higher Layer Protocol Data Transmitted by Station or AP | 3 |

Thus, when a transmission sent to or from the station is received, the detector examines the transmission to determine if the transmission is one of the types of transmissions listed above. If it is, then the detector can determine the state of the station that received or sent the transmission.

For example, if the detector receives a probe request frame sent by the station, then the detector can determine that the station is at State 1. If the detector receives a probe response frame sent by the AP to the station, then the detector can determine that the station is at State 1. If the station receives a data frame, which is a higher layer protocol data, sent by the station or received by the station, then the detector can determine that the station is at State 3.

The detector can also be configured to display the types of transmissions as a checklist. For example, the following checklist can be displayed:

TABLE 2

Beacon received by Station
Probe request sent by Station
Probe response received by Station
Auth. request sent by Station
Auth. challenge received by Station
Auth. challenge response received by Station
Auth. final response received by Station
Assoc. request sent by Station
Assoc. response received by Station TABLE 2-continued Data sent by Station
Data received by Station When one of the transmissions on the list is detected, then that type of transmission is marked. For example, if an authorization request sent by the station is received, the detector can "check off" the "Auth. request sent" line from above. In this manner, the user of the detector, such as an administrator of the WLAN or a trouble-shooter, can more easily determine the state of the station.

Additionally, as will be explained below, a station can use one or more channels. As such, a separate checklist can be provided for each of the available channels.

Figure 5:
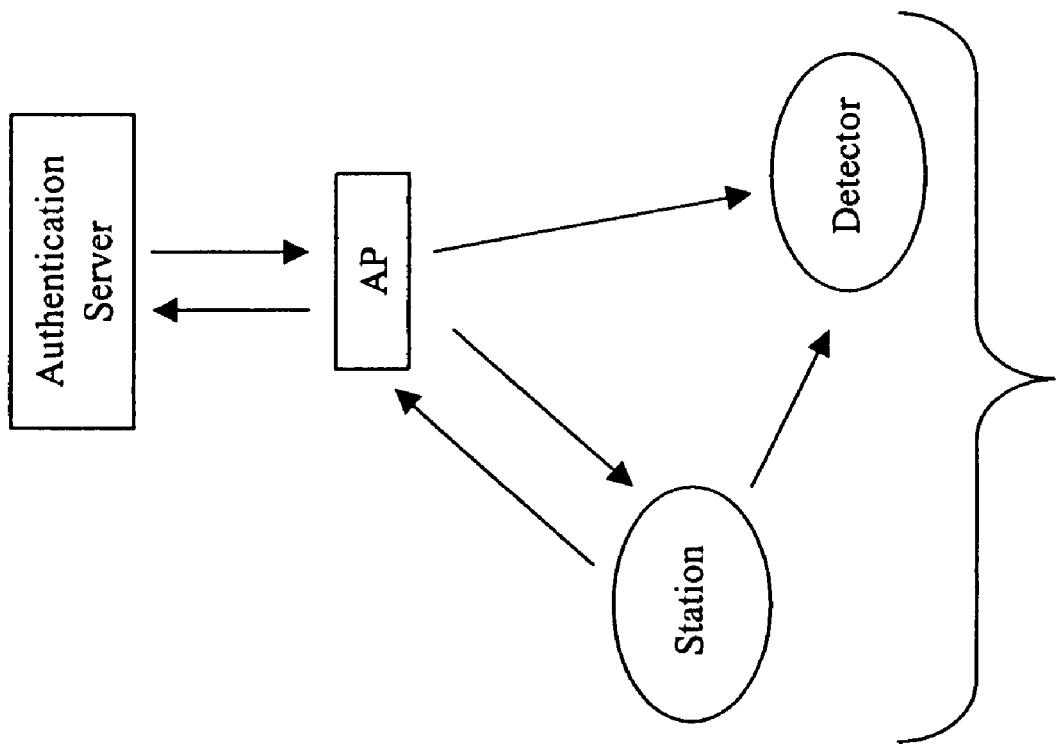
FIG. 5 shows another exemplary embodiment of an access point and a station exchanging transmissions.

With reference to FIG. 5, as described above, before a station can receive service from an AP, the station must be authenticated. In order to increase security, an authentication protocol can be implemented in a WLAN environment, such as the extensible authentication protocol over LANs (EAPOL) protocol in accordance with the IEEE 802.1x standard.

In accordance with the current EAPOL protocol, a station wanting to be authenticated, which is referred to as a supplicant, is authenticated using an authentication server, such as a remote authentication dial in user service (RADIUS) server. As depicted in FIG. 5, the station communicates with the AP, and the AP, which is referred to as the authenticator, communicates with the authentication server to authenticate the station.

During the authentication process, the station, AP, and authentication server exchange a number of transmissions. More specifically, in one exemplary mode of operation, the AP sends an "EAP-Request/Identity" transmission to the station. The station then sends an "EAP-Response/Identity" transmission to the AP. The AP then sends the received "EAP-Response/Identity" transmission to the authentication server. In response, the authentication server sends a challenge to the AP, such as with a token password system. The AP sends the challenge to the station as a credential request. The station sends a response to the credential request to the AP. The AP sends the response to the authentication server. If the response from the station is proper, the authentication server sends an "EAP-Success" transmission to the AP, which sends the package to the station. If the response is improper, the authentication server sends an "EAP-Failure" transmission to the AP, which sends the transmission to the station. It should be recognized that the number and types of transmissions exchanged between the station, AP, and authentication server can vary depending on the implemented mode of operation.

As described above, in one exemplary embodiment, a detector can be located in the WLAN such that the detector can receive transmissions sent from and received by the station. Again, note that the detector need not necessarily be physically adjacent the station. Instead, the detector can be sufficiently near the station such that the reception range of the detector covers the station.

By examining the transmissions sent from and received by the station, the detector can determine the state of the station. More specifically, the detector can receive the transmissions exchanged between the station and the AP during the authentication process described above in accordance with the EAPOL protocol. The detector can then determine the state of the station based on the received transmissions.

More particularly, because the EAPOL transactions occur in state 3 as 802.11 data, the station can be determined as being in state 3.

Additionally, the detector can also be configured to display the types of transmissions as a checklist. For example, the following checklist can be displayed:

TABLE 3

802.1X initiated sent by Station
Identity request sent by Station
Identity response received by Station
Credential request sent by Station
Credential response received by Station
802.1X authentication OK by Station
802.1X authentication failed by Station
De-authentication sent by Station
Data sent by Station
Data received by Station When one of the transmissions on the list is detected, then that type of transmission is marked. For example, if an "EAP-Request/Identity" package sent by the AP is received, the detector can "check off" the "Identity request sent" line from above. In this manner, the user of the detector, such as an administrator of the WLAN or a trouble-shooter, can more easily determine the state of the station.

Additionally, as will be explained below, a station can use one or more channels. As such, a separate checklist can be provided for each of the available channels.

To identify the transmissions sent from and received by the station, the detector obtains the MAC address of the station, which can be obtained from the source and destination address fields of the transmitted frames. The MAC address can also be obtained directly from the station. Alternatively, the MAC address of the station can be stored and retrieved from a table of MAC address assignments, which can be maintained by an administrator of the WLAN.

Additionally, if a particular AP that the station is attempting to communicate is known, the particular channel that the AP is operating on can then be monitored. If the station is attempting to communicate with multiple APs and the identity of those APs are known, then the particular channels that those APs are operating on can then be monitored.

Furthermore, the detector can scan the channels of the wireless local area network to receive transmissions sent from and received by the station with known or unknown APs. As described above, in the current implementation of the IEEE 802.11 standard, a total of 11 channels are used in the US, 13 channels are used in Europe, and 14 channels are used in Japan. For the sake of convenience, the following description will assume that the detector and the WLAN are located in the U.S. However, note that the detector can be configured to operate with any number of channels and in various countries.

In one configuration, the detector is configured to begin scanning by monitoring channel 1, then scan down each of the remaining 10 channels. If a station is having difficulty obtaining service, it will typically switch channels and repeat the association attempt therefore repeating the association failure scenario. A station can continuously cycle through the channels in an effort to obtain service. As such, the detector is configured to monitor a particular channel for a sufficient amount of time so that the station can complete one or more cycles. For example, the detector can be configured to monitor each channel for about 3 seconds.

If no transmissions are detected after scanning all of the channels, then the station is rebooted. As described above, a station can be configured to cycle repeatedly through the channels in an attempt to obtain service. However, a station can also be configured to only attempt one cycle and to stop after the last channel has been attempted. When the station is rebooted, it typically begins operating on channel 1. As such, by rebooting the station and monitoring on channel 1, a transmission sent to or received by the station can be detected. However, a station can take some time to reboot, typically a few seconds. As such, the detector is configured to monitor channel 1 for a longer duration than the other channels. For example, in one configuration, the detector is configured to monitor channel 1 for a period of 30 seconds.

As described above, the detector can scan the available channels in the WLAN. Alternatively, specific channels can be selected to be scanned. Although the detector scans the channels, it passively receives the transmissions, meaning that it does not broadcast signals on the WLAN. This has the advantage that additional bandwidth on the WLAN is not consumed.

The detector can be a station in the wireless local area network. Additionally, the detector can be mobile, portable, stationary, and the like. For instance, the detector can be a laptop computer, a personal digital assistant, and the like. In addition, the detector can be used by a user as a diagnostic tool, by an administrator as an administrative tool, and the like.

Although the present invention has been described with respect to certain embodiments, examples, and applications, it will be apparent to those skilled in the art that various modifications and changes may be made without departing from the invention.

We claim:

1. A method of determining the state of a station in a wireless local area network, wherein the state of the station indicates whether the station has authenticated and/or associated with an access point in the wireless local area network, the method comprising: receiving transmissions exchanged between the station and the access point using a detector located adjacent to the station, wherein the transmissions are exchanged over the wireless local area network; analyzing the received transmissions to determine the state of the station and determining the state of the station based on the analyzing, wherein the state of the station at least indicates whether the station is authenticated to the access point.

2. The method of claim 1, wherein analyzing comprises: examining a received transmission; and determining an indicative state of the station associated with the received transmission.

3. The method of claim 1, wherein the transmissions exchanged between the station and the access point comply with an extensible authentication protocol over local area networks (EAPOL) protocol.

4. The method of claim 1, wherein the state of the station further indicates whether the station is associated with the access point.

5. An apparatus for determining the state of a station in a wireless local area network, wherein the state of the station indicates whether the station has authenticated and/or associated with an access point in the wireless local area network, the apparatus comprising: a detector configured to: receive transmissions exchanged between the station and the access point when the detector is located adjacent to the station; analyze the received transmissions to determine the state of the station; and determine the state of the static based on the analyzing, wherein the state of the station at least indicates whether the station is authenticated to the access point.

6. The apparatus of claim 5, wherein the transmissions exchanged between the station and the access point comply with an extensible authentication protocol over local area networks (EAPOL) protocol.

7. The apparatus of claim 5, wherein the detector is configured to receive transmissions by: scanning a plurality of channels used in the wireless local area network, wherein the station is rebooted if no transmissions are received during a scan of the plurality of channels.

8. The apparatus of claim 5, wherein the state of the station further indicates whether the station is associated with the access point.

9. A computer-readable storage medium containing computer executable code to determine the state of a station in a wireless local area network, wherein the state of the station indicates whether the station has authenticated and/or associated with an access point in the wireless local area network, by instructing a computer to operate as follows: receiving transmissions exchanged between the station and the access point; analyzing the received transmissions to determine the state of the station; and determining state of the station based on the analyzing, wherein the state of the station at least indicates whether the Station is authenticated to the access point.

10. The computer-readable storage medium of claim 9, wherein the transmissions exchanged between the station and the access point comply with an extensible authentication protocol over local area networks (EAPOL) protocol.

11. The computer-readable storage medium of claim 9, wherein receiving comprises: scanning a plurality of channels used in the wireless local area network, wherein the station is rebooted if no transmissions are received during a scan of the plurality of channels.

12. The computer-readable medium of claim 9, wherein the state of the station further indicates whether the station is associated with the access point.

* * * * *